United States Patent [19]

Porter et al.

[11] Patent Number: 5,619,546
[45] Date of Patent: Apr. 8, 1997

[54] RESISTANCE TEMPERATURE DETECTOR NOZZLE MECHANICAL CLAMP

[75] Inventors: Douglas S. Porter, Simsbury, Conn.; Keith E. Coe, Hixton, Tenn.

[73] Assignee: Combustion Engineering, Inc., Windsor, Conn.

[21] Appl. No.: 425,552

[22] Filed: Apr. 20, 1995

[51] Int. Cl.$^6$ ................................................ G21C 13/00
[52] U.S. Cl. .................... 376/204; 376/203; 376/205; 376/211; 376/247; 376/451
[58] Field of Search ............................ 376/204, 203, 376/205, 211, 247, 451; 277/135; 976/DIG. 175

[56] References Cited

U.S. PATENT DOCUMENTS

| | | | |
|---|---|---|---|
| 3,850,796 | 11/1974 | Thome | 376/204 |
| 4,049,186 | 9/1977 | Hanneman et al. | 228/225 |
| 4,259,156 | 3/1981 | Neuenfeldt et al. | 376/286 |
| 4,480,841 | 11/1984 | Schukei et al. | 277/1 |
| 4,655,483 | 4/1987 | Margotta | 285/169 |
| 4,670,212 | 6/1987 | Geoffray et al. | 376/247 |
| 4,723,795 | 2/1988 | Shenoy | 285/138 |
| 4,826,217 | 5/1989 | Guerrero | 285/158 |
| 5,157,619 | 10/1992 | Palusamy et al. | 364/508 |

*Primary Examiner*—Charles T. Jordan
*Assistant Examiner*—Meena Chelliah
*Attorney, Agent, or Firm*—John H. Molholland

[57] ABSTRACT

A fluid tight mechanical clamp for creating a compressed graphite seal between a resistance temperature detector nozzle and a NSSS piping hot or cold leg pipe is provided which includes a split graphite seal ring, a peripheral seal back-up ring, a split load sleeve to axially compress and radially expand the split seal ring, a reactor plate and load ring with bolts to drive the load sleeve and compress the seal, and a blowout retainer to prevent the nozzle from blowing out of its seat in the pipe wall in the event of a weld failure. Extensive welding procedures to repair nozzle leaks are thus eliminated.

5 Claims, 1 Drawing Sheet

RESISTANCE TEMPERATURE DETECTOR NOZZLE MECHANICAL CLAMP

BACKGROUND OF THE INVENTION

1. Field of the Invention

The present invention is generally related to a nuclear steam supply system (NSSS) resistance temperature detector (RTD) nozzle mechanical clamp seal assembly and blowout retainer designed to prevent leakage from or around an RTD nozzle and blowout of the nozzle from its joint or seat in NSSS piping.

2. General Background

The resistance temperature detectors measure the nuclear reactor coolant temperature in both the "hot" and "cold" legs of the NSSS. The RTD's are installed through the welded penetrations in the Reactor Coolant System (RCS) piping. The penetrations are susceptible to cracking and leakage caused by primary water stress corrosion cracking (PWSCC) of the, typically, Inconel 600 stainless steel nozzles. The present repair method for these nozzles requires a lengthy and expensive welding procedure, which increases the amount of work and time required to restore the NSSS to operation once this type of cracking and deterioration occurs.

Examples of this type of technique in repairing pressurized heater sleeve penetration nozzles which involve analogous pressure boundary welding procedures are disclosed in U.S. Pat. No. 5,094,801 dated Mar. 10, 1992 by Dixon et al., U.S. Pat. No. 5,091,140 dated Feb. 25, 1992 by Dixon et al., and U.S. Pat. No. 4,255,840 dated Mar. 17, 1991 by Cook et al.

The RTD nozzle mechanical clamp seal of the invention prevents reactor coolant leakage at the RTD nozzles without the necessity of such a welding procedure.

In U.S. Pat. No. 4,655,483, filed May 14, 1984, entitled "Boundary Seal for Pressure Penetration", and assigned to the assignee of the present invention, a connector device provides a primary pressure boundary between a nozzle and a column concentrically disposed therein. The connector device includes a closure member for compressing a seal ring against the end of a nozzle. The closure member includes a hub portion which defines an annular space between the closure member and the column. Packings are inserted in this annular space and compressed by means of a drive unit which includes a drive sleeve and an actuator nut threaded to an upper portion of the sleeve. A split-ring type collar is clamped to the column to provide support for the column. Rotation of the actuator nut loads the column thus causing it to be longitudinally displaced relative to the closure member until a tight connection is made. Continued actuation of the nut advances the drive sleeve along the annular space to compress the gasket to thereby complete the fluid-tight connection. While the boundary seal of the referenced prior art application can be installed in a relatively short time when compared to previous devices of like character, it nevertheless requires substantial effort to install the connector, particularly the collar clamp which has eight bolts to tighten. Further, this boundary seal assembly does not completely insure against the column assembly accidentally moving upwardly or downwardly during the assembly process.

In U.S. Pat. No. 4,723,795 filed May 5, 1996, entitled "Instrument Penetration For High Pressure Vessels", and assigned to the assignees of the present invention, an assembly provides a fluid-tight connection between a nozzle and a concentric tubular column supported in the nozzle. The nozzle is provided with an interior flange while a ledge extends from the exterior of the column at a point which will be displaced from the nozzle flange when the column is disposed in the nozzle. A seal assembly, which comprises an annular packing or sealing ring, is positioned on the flange and surrounds the column for establishing a seal between the nozzle and the column. A drive sleeve is received within the nozzle. The drive sleeve has a first end, which bears against the seal assembly, and a drive shoulder. A spacer sleeve is threadedly received in the nozzle for axial positioning relative thereto. A first end of the spacer sleeve is configured for engagement with the column ledge. A clamp assembly is mounted to the column at a fixed axial position relative to a first end of the nozzle. The clamp assembly includes an adjustable means for axially displacing the column relative to the nozzle so that the column ledge firmly engages the lower end of the spacer sleeve to fix the axial position of the column relative to the nozzle. A drive means, which comprises a nut threaded to the nozzle, is engageable with the drive shoulder of the drive sleeve to axially force the drive sleeve first end toward the nozzle flange to compress the sealing assembly into sealing engagement with the column and the nozzle to prevent fluid leakage therebetween. This prior art assembly provides a fluid-tight connection between a nozzle, which has an interior flange, and a column, which is concentrically supported within the nozzle Further background and prior art information is provided by a paper "Repair Method for Control Rod Drive Stub Tube Using a Mechanical Graphite Seal" by C. W. Ruoss, Jr. et al, presented at the EPRI and EPRI NDE Center Sponsored BWR Reactor Pressure Vessel & Internals Inspection & Repair Workshop, Jul. 16–18, 1991, Charlotte, N.C.

SUMMARY OF THE INVENTION

It is an object of the present invention to provide a mechanical clamp designed to prevent leakage from the resistance temperature detector nozzles on nuclear reactor coolant system piping which can be readily installed by bolting without the need of extensive welding.

It is a further object of the invention to provide a mechanical clamp seal designed with split sections to allow installation over a resistance temperature detector.

It is a further object of the invention to provide a graphite seal at a nozzle to pipe interface to prevent leakage from the nozzle annulus.

It is a further object of the invention to provide a mechanical clamp seal which includes a blowout retainer to prevent ejection of the nozzle in the event of a weld failure.

The above objects are accomplished in a fluid tight mechanical clamp seal for nuclear reactor coolant system hot and cold leg pipe resistance temperature detector nozzles which has a split an annular compressible graphite seal ring surrounding the nozzle at a pipe and nozzle joint. The mechanical clamp seal has an annular split ring made up of plural sections surrounding and confining the periphery of the split annular seal ring into which is telescopically received an annular split load sleeve made up of plural sections to compress axially the seal ring against the pipe, thereby also to expand radially the seal ring against the nozzle and the seal confirming annular split ring.

A reaction plate having a first surface shaped to engage the pipe, a second and annular surface to peripherally engage and to confine radially the split ring and a third surface to confine axially the split ring against the pipe is bolted to the pipe by means of threaded blind holes provided in the pipe. The third surface has an opening sufficiently great to allow its installation without disassembly of the resistance temperature detector or nozzle to pipe joint.

A load ring has a central opening and surrounds, and has a surface which axially abuts against, the split load sleeve. Bolts are threadedly connected to holes in the reaction plate and pass through openings in the load ring to provide an axial driving and compressing force through the load ring surface axially abutting against the split load sleeve to compress the annular seal ring and provide an effective seal at the pipe and nozzle joint.

The load ring central opening has an internally threaded portion and receives a split blowout retainer made up of plural sections threaded therein. The central opening is surrounded by a peripheral inwardly directed flange for engaging a radially directed surface provided on the nozzle to prevent the nozzle's ejection from the pipe in the event of a weld failure at the nozzle pipe joint.

DETAILED DESCRIPTION OF THE PREFERRED EMBODIMENT

Figure 1:
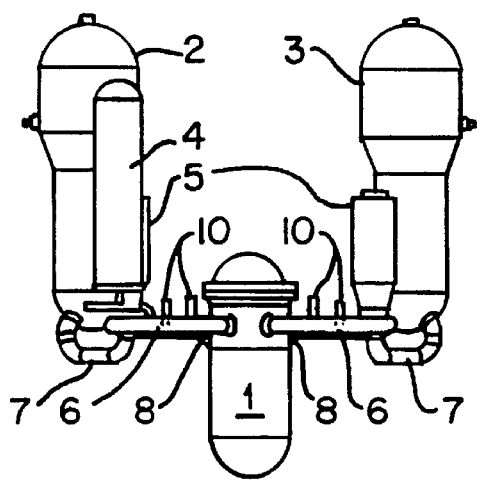
FIG. 1 is a schematic elevational view of a NSSS having hot and cold leg resistance temperature detector nozzles.
Figure 2:
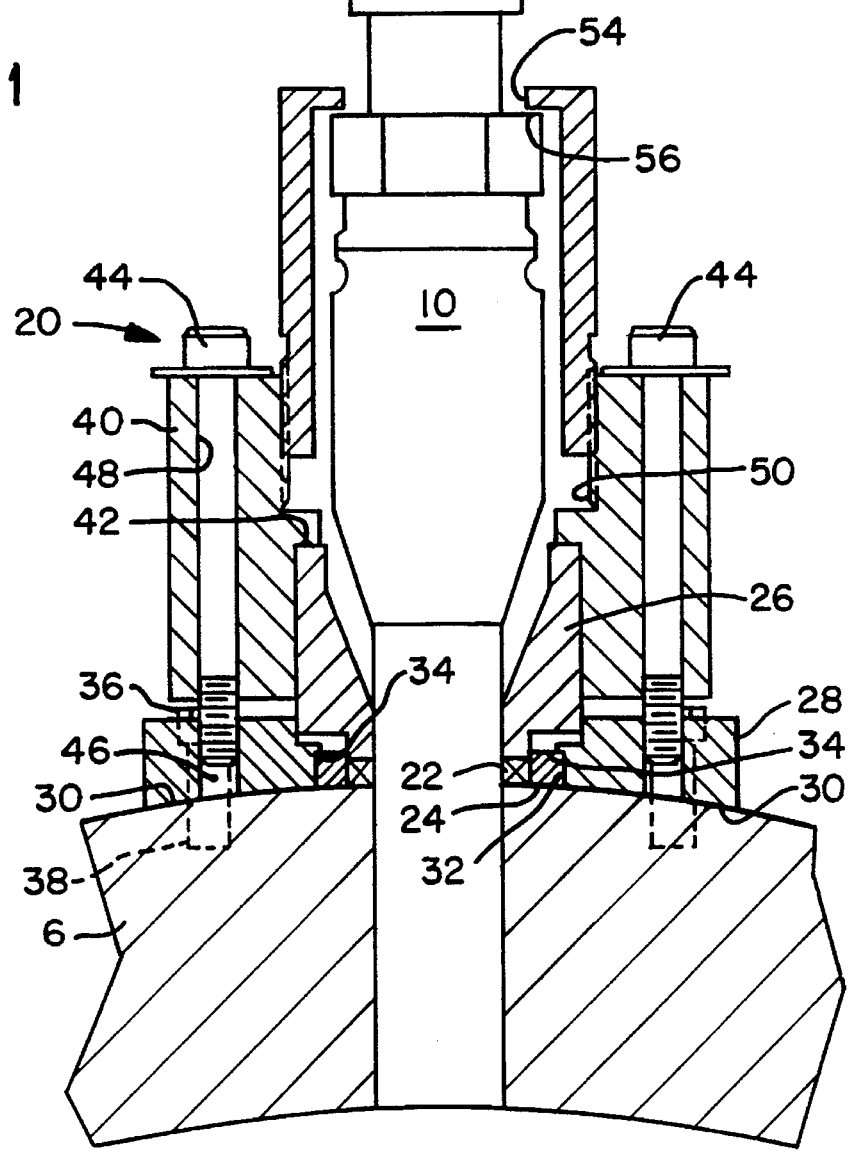
FIG. 2 is a partially schematic cross-sectional elevational view of the novel fluid tight mechanical clamp seal for the RTD nozzles of FIG. 1

The NSSS of FIG. 1 includes a pressurized water nuclear reactor 1 connected by piping to steam generators 2 and 3 and pressurizer 4. The piping includes cold legs comprising: pumps 5, discharge pipes 6 from the pumps 5 to the reactor 1 and suction pipes 7 from the steam generators 2 and 3 to the pumps 5. The hot legs 8 which are shown in FIG. 1 behind discharge pipes 6, and are of slightly larger diameter than the cold leg pipes 6 and 7, run from the reactor 1 to the steam generators 2 and 3. The RTD nozzles are shown on both hot legs 8 and cold leg pipes 6 and 7 at illustrative positions in FIG. 1.

The RTD nozzle 10 is hollow and contains a thermocouple type of resistance temperature detector, not shown, within its central passageway. The end of the thermocouple will, typically, extend into the interior pipe opening of a carbon steel discharge pipe 6, or other NSSS pipe, from the nozzle 10, to sense the temperature of reactor coolant fluid flowing therethrough.

Originally, the nozzle 10 to pipe 6 joint is a weld. The deterioration of this weld is often the cause when there is leakage at the joint.

To provide a fluid tight seal for nuclear reactor coolant system hot and cold leg RTD nozzles 10, the preferred structure of the invention is a mechanical clamp and blowout retainer as described in detail, below.

The fluid tight mechanical clamp seal is generally designated by the numeral 20. It has, for sealing purposes, at the joinder of the transversely extending nozzle 10 and pipe 6, a split annular compressible graphite or similar composition seal ring or packing 22 (typically one split annular piece) commonly known in the nuclear industry as "Grafoil."

The mechanical clamp seal 20 has an annular back-up split ring 24 made of plural (two or more) sections surrounding and confining the periphery of the split annular seal ring. An annular similarly split load sleeve 26 made up of plural (two or more) sections is telescopically received in the split seal ring 24 to compress axially the graphite seal ring 22 against the pipe 6, thereby also to expand radially the seal ring against the nozzle 10 and the seal confining split ring 24.

A reactor plate 28 is provided which has a first surface 30 shaped to engage the pipe 6. A second and annular surface 32 of the reaction plate 28 peripherally engages and radially confines the split ring 24 and a third surface 34 of the reaction plate 28, which could be termed a flange surface, confines axially the split ring 24 against the pipe 6. Reaction plate 28 is bolted to pipe 6 by means of bolts 36 passing therethrough and threadedly secured in blind threaded holes 38 in pipe 6. The third surface or flange 34 preferable has an opening sufficiently great to allow its installation by passing down over the nozzle 10 without disassembly of the RTD or the nozzle 10 to pipe 6 joint.

A load ring 40 is provided for driving the split load sleeve 26. The load ring 40 has a central opening and surround, and has a surface 42 which axially abuts against, the split load sleeve 26. Bolts 44 are threadedly connected to blind threaded holes 46 in the reaction plate 28 through holes 48 in the load ring 40 such that the ring 40 provides an axial driving and compressing force through its surface 42 axially abutting against load sleeve 26 to compress the annular seal ring 22 and provide an effective seal at the pipe 6 and nozzle 10 joint.

The load ring central opening has an internally threaded portion 50 and receives a split blowout retainer 52 made up of plural (two or more) externally threaded sections secured therein. The central opening of the retainer is surrounded at its outer end by a peripheral inwardly directed flange 54 for engaging a radially directed surface 56 provided on the nozzle 10 to prevent the nozzle's ejection from the pipe in the event of a weld failure at the nozzle pipe joint.

Thus is provided a fluid tight mechanical clamp seal 20 with a blowout retainer 52 according to the objects and preferred embodiments of the invention.

We claim:

1. A fluid tight mechanical clamp seal for nuclear reactor coolant system hot and cold leg pipe transversely extending resistance temperature detector nozzles comprising:

an annular compressible seal ring at a pipe and nozzle joint surrounding said nozzle;

an annular split ring made up of plural sections surrounding and confining the periphery of said annular seal ring;

an annular split load sleeve made up of plural sections telescopically received in said split ring to compress axially said peripherally confined seal ring against said pipe and thereby also to expand radially said peripherally confined seal ring against said nozzle and against said annular split ring;

a reaction plate having a first surface shaped to engage said pipe, a second and annular surface to peripherally engage and to confine radially said split ring and a third surface to confine axially said split ring against said pipe;

said reaction plate being fixed to said pipe;

a load ring surrounding and having a surface axially abutting against said split load sleeve;

said load ring having bolts threadedly connected to holes in said reaction plate to provide an axial driving and compressing force through the load ring surface axially abutting against said split load sleeve to compress said annular seal ring.

2. The fluid tight mechanical seal of claim 1 in which the annular seal ring is made of compressible graphite material.

3. The fluid tight mechanical seal of claim 1 in which said load ring surrounding said split load sleeve has a central opening of sufficient radial extent to allow installation over the resistance temperature detector nozzle without disassembly of the nozzle.

4. The fluid tight mechanical seal of claim 3 in which the load ring central opening is internally threaded and receives a split blowout retainer made up of plural sections threaded therein.

5. The fluid tight mechanical seal of claim 4 in which the central opening is surrounded by a peripheral inwardly directed flange for engaging a radially directed surface provided on the nozzle to prevent the nozzle's ejection from the pipe in the event of a weld failure at the nozzle pipe joint.

* * * * *